(12) United States Patent
Kamijima et al.

(10) Patent No.: US 8,024,445 B2
(45) Date of Patent: Sep. 20, 2011

(54) SOCKET MANAGEMENT DEVICE AND SOCKET MANAGEMENT METHOD

(75) Inventors: Kyoichi Kamijima, Shiojiri (JP); Toshihiro Shima, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 140 days.

(21) Appl. No.: 12/407,569

(22) Filed: Mar. 19, 2009

(65) Prior Publication Data
US 2009/0248875 A1 Oct. 1, 2009

(30) Foreign Application Priority Data
Mar. 28, 2008 (JP) ................................. 2008-086668

(51) Int. Cl.
*G06F 15/173* (2006.01)
(52) U.S. Cl. ........................ 709/223; 709/224; 718/104
(58) Field of Classification Search .................. 709/223, 709/224; 718/102, 104
See application file for complete search history.

(56) References Cited

U.S. PATENT DOCUMENTS

| | | | | |
|---|---|---|---|---|
| 5,640,394 | A * | 6/1997 | Schrier et al. ................. | 370/389 |
| 7,069,326 | B1 * | 6/2006 | Bush ............................. | 709/226 |
| 2003/0091037 | A1 * | 5/2003 | Latif et al. ..................... | 370/355 |
| 2004/0003085 | A1 * | 1/2004 | Joseph et al. ................. | 709/226 |
| 2004/0153545 | A1 * | 8/2004 | Pandya et al. ................. | 709/226 |
| 2006/0020705 | A1 | 1/2006 | Paek ............................. | 709/228 |
| 2006/0165074 | A1 * | 7/2006 | Modi et al. .................... | 370/389 |
| 2006/0171306 | A1 * | 8/2006 | Stout et al. .................... | 370/229 |
| 2007/0053381 | A1 * | 3/2007 | Chacko et al. ................ | 370/468 |
| 2007/0294410 | A1 * | 12/2007 | Pandya et al. ................. | 709/226 |
| 2008/0034370 | A1 * | 2/2008 | Huizenga ...................... | 718/104 |

FOREIGN PATENT DOCUMENTS

| | | |
|---|---|---|
| JP | 06332833 A | 12/1994 |
| JP | 11110452 A | 4/1999 |
| JP | 2000-148426 | 5/2000 |
| JP | 2006-031685 | 2/2006 |
| JP | 2006-107095 | 4/2006 |

OTHER PUBLICATIONS

"Tivoli Omegaron XE for IMS on z/OS users guide version 4.1.0" Manual 2008-00982-001, IBM Japan, Ltd. Dec. 2006, pp. 155-175 (with partial English translation).

* cited by examiner

*Primary Examiner* — Oanh Duong
(74) *Attorney, Agent, or Firm* — DLA Piper LLP (US)

(57) ABSTRACT

In order to properly allocates a limited number of sockets to applications (202, 202, . . . ) in a computer system so as to improve the system network performance, an application management module (300) memorizes the total number of sockets which OS (100) can supply to the applications (202, 202, . . . ), and a target number of sockets for each application. When an application (202) wants to obtain a socket, the application management module (300) recalculates the target number of sockets which can be allocated to the application (202), using a predetermined scheduling algorithm (312), based on the number of sockets presently unallocated and the priority revel of the application (202), and notifies the recalculated target number to the application (202). The application (202) judges from the notified target number whether a socket can be obtained or not, and based on the judgment determines whether or not to actually obtain a socket from the OS (100).

9 Claims, 7 Drawing Sheets

FIG. 2

PATTERN CALCULATION TABLE 312A

| RATIO OF REMAINING SOCKET COUNT WITH RESPECT TO TOTAL SOCKET COUNT | PATTERN TO BE SELECTED | | |
| --- | --- | --- | --- |
| | PATTERN 1 | PATTERN 2 | PATTERN 3 |
| 50% OR HIGHER | ✓ | | |
| 20% OR HIGHER AND LOWER THAN 50% | | ✓ | |
| LOWER THAN 20% | | | ✓ |

FIG. 3

SOCKET-ALLOCATION-COUNT RATIO TABLE 312B

| PRIORITY LEVEL OF APPLICATION | SOCKET-ALLOCATION-COUNT RATIO AMONG APPLICATIONS | | |
| --- | --- | --- | --- |
| | PATTERN 1 | PATTERN 2 | PATTERN 3 |
| 1 (HIGH) | 50 % | 60 % | 80 % |
| 2 (INTERMEDIATE) | 30 % | 30 % | 15 % |
| 3 (LOW) | 20 % | 10 % | 5 % |

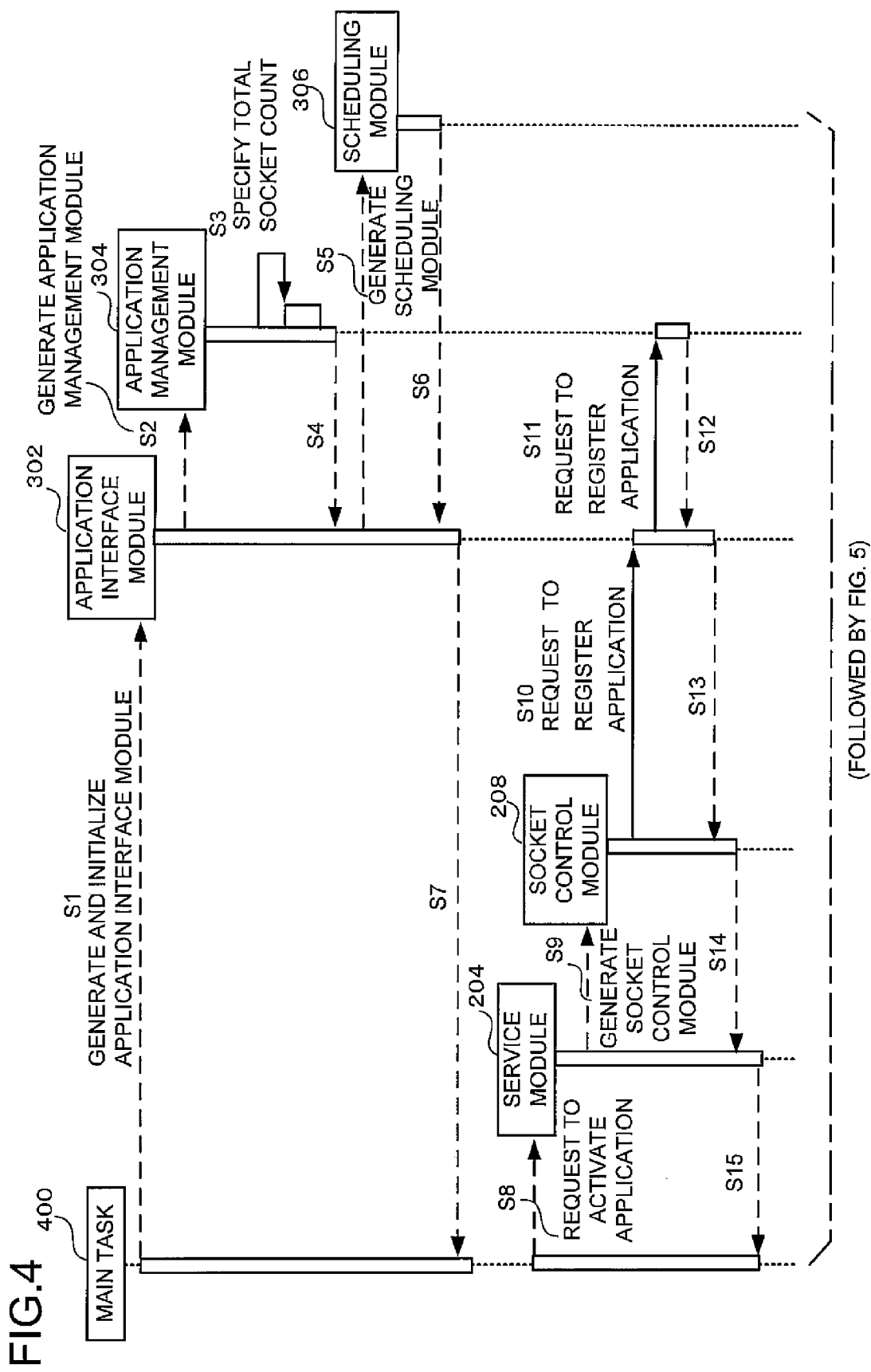

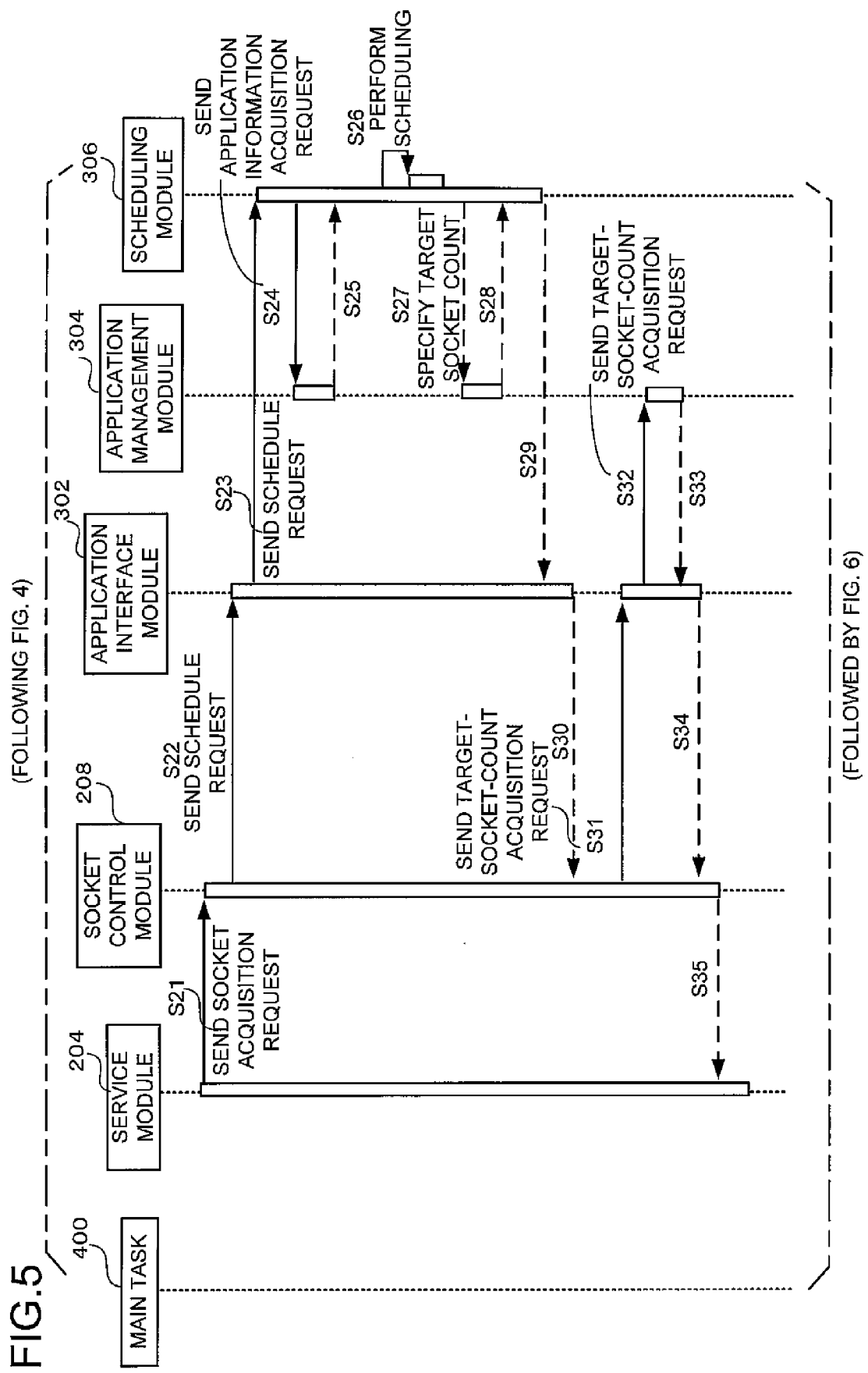

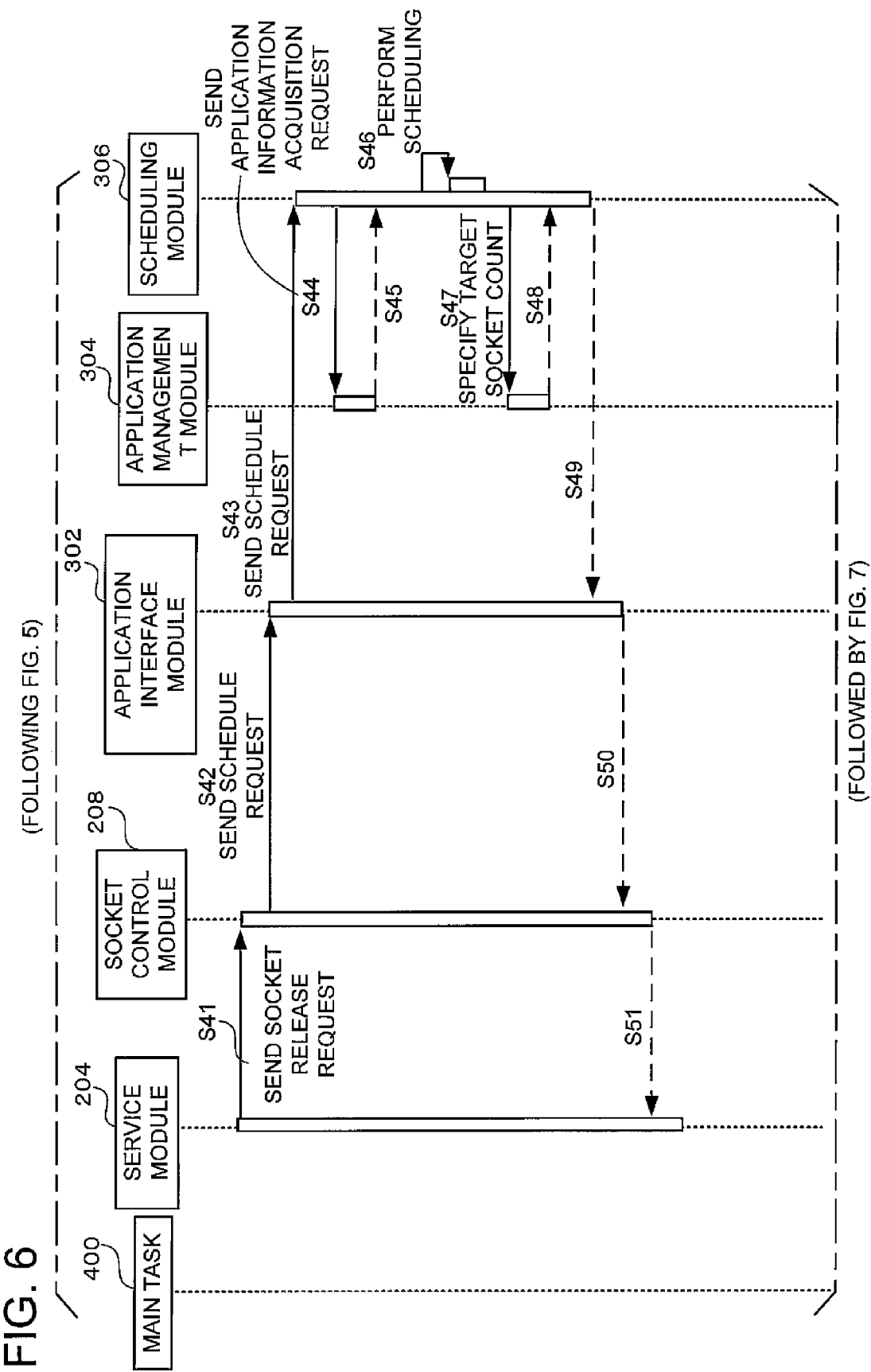

SOCKET MANAGEMENT DEVICE AND SOCKET MANAGEMENT METHOD

CROSS-REFERENCE TO RELATED APPLICATIONS

This application relates to and claims priority from Japanese Patent Application No. 2008-086668 filed on Mar. 28, 2008, the entire disclosure of which is incorporated herein

BACKGROUND

1. Technical Field

The present invention relates to a technology of managing the number of socket descriptors (referred to as "sockets" in this specification) allocated to each of one or more network applications operating in a computer system.

2. Related Art

A socket interface is used for programming a general network application, and the application uses a socket descriptor (or socket) generated by the socket interface to identify a communication destination for communication.

In a computer system which has a relatively large amount of built-in memory, such as a personal computer, the network application can use sockets without considering the upper-limit number of sockets. In contrast, a computer system built in an apparatus such as a printer has a small amount of built-in memory, and only a small number of sockets corresponding to the amount of the memory can be used. Therefore, it is usual that the number of sockets which can be used are allocated in advance to each network application, and a program is created with the allocated sockets.

In the latter case (the computer system built in an apparatus such as a printer), since a certain number of sockets need to be allocated even to rarely used applications, the number of sockets to be allocated to an application for a main function (for example, a print function in the printer) which is most frequently used in the apparatus is reduced, thus reducing the number of client connections which can be established at the same time. A simple solution to such a problem of reduction in the network performance of a product is to increase the amount of built-in memory, which naturally causes an increase in cost.

As for socket allocation, JP-A-2000-148426 discloses a technology in which sockets to be used by an application that monitors a printer are reserved in advance in order to avoid a situation where communication cannot be performed because of socket shortage, and the reserved sockets are used in response to a request of the application. With this technology, the application can be always operated normally. However, since sockets that are not being used are also always reserved, the socket resources are not efficiently used in the entire product.

SUMMARY

An advantage of some aspects of the invention is to more properly allocate a limited number of sockets to applications in a computer system, so as to contribute to the improvement of the system network performance.

According to a first aspect of the invention, there is provided a socket management device that manages the number of sockets allocated to each of one or more applications operating in a computer system, the socket management device including: an application management module that stores a total socket count indicating the total number of sockets which can be allocated to all of the one or more applications, and a target socket count for each of the one or more applications indicating a target value for the number of sockets allocated to each of the one or more applications; a scheduling module that recalculates, when a socket-count change request indicating a socket acquisition request or a socket release request is received from any of the one or more applications, the target socket count of the request-source application which has issued the socket-count change request, based on the received socket-count change request and based on the total socket count and the target socket count for each of the one or more applications, which are stored in the application management module, and that updates the target socket count of the request-source application stored in the application management module so as to have the recalculated target socket count; and a response module that generates a response to the socket-count change request based on the target socket count recalculated by the scheduling module, and that notifies the response to the request-source application.

The socket management device stores the total socket count and the target socket count for each of the one or more applications, and recalculates, when a socket acquisition request or a socket release request (either is also called a socket-count change request) is received from any of the one or more applications, the target socket count of the request-source application which has issued the socket-count change request, based on the received socket-count change request and based on the stored total socket count and target socket count for each of the one or more applications. The socket management device generates a response to the socket-count change request based on the recalculated target socket count, and returns the response to the request-source application.

The response may indicate the recalculated target socket count of the request-source application, or may indicate whether the socket-count change request, particularly, the socket acquisition request, has been allowed (for example, indicate that all of the requested number of sockets can be obtained, that part of the requested number of sockets can be obtained, or that any socket cannot be obtained).

Therefore, the request-source application can check the target socket count of the request-source application, or check whether the socket-count change request, particularly, the socket acquisition request, can be allowed, from the response received from the socket management device. When the request-source application determines whether to actually obtain a socket from an operating system according to the checking result, the number of sockets actually allocated to the application meets the target socket count of the application calculated by the socket management device. As a result, it is possible to allocate a proper number of sockets to each application.

The reason why the socket management device does not manage the actual socket count held by each application but manages the target socket count of the application will be described below. Specifically, since the actual socket count is managed by the OS, even though a socket is released in the application, time lag occurs until the socket is actually released in the OS. Many usual OSs hold a socket to be released, for several tens of seconds to several minutes before actually releasing it. In other words, it is difficult to know the actual socket count from the outside of the OS. For this reason, the socket management device according to the first aspect of the invention does not manage the actual socket count but manages the target socket count. Accordingly, the actual socket count is not always equal to the target socket count. Therefore, the socket management device may take into account the difference between the actual socket count held by each application and the target socket count of the application, to schedule the target socket count.

It is preferable that the socket management device according to the first aspect of the invention be configured as follows. Specifically, the application management module further stores a priority level of each of the one or more applications; and the scheduling module recalculates the target socket count of the request-source application based on the received socket-count change request, based on the total socket count and the target socket count for each of the one or more applications, which are stored in the application management module, and based on the priority level of the request-source application, which is stored in the application management module. For example, the scheduling module determines a socket-allocation-count ratio among the one or more applications based on the priority level of each of the one or more applications, stored in the application management module, and calculates the target socket count of the request-source application according to the determined socket-allocation-count ratio.

In this case, it is possible to control socket allocation with the priority level of each application being taken into account, such that a socket is more preferentially allocated to an application having a higher priority level.

Further, it is preferable that the socket management device according to the first aspect of the invention be configured as follows. Specifically, the scheduling module controls a socket-allocation-count ratio among the one or more applications according to a remaining socket count which corresponds to the difference between the total socket count and the sum of the target socket counts of the one or more applications.

Therefore, it is possible to change the socket-allocation-count ratio among the one or more applications depending on the remaining socket count indicating the remaining number of sockets which have not yet been allocated to any application. For example, the smaller the remaining socket count is, the larger the socket-allocation-count ratio of an application that has a higher priority level can be made. As a result, even when the remaining socket count is reduced, the number of sockets allocated to an application that has a higher priority level is not changed much, thereby maintaining the network performance of the entire system at a high level.

Furthermore, it is preferable that the socket management device according to the first aspect of the invention be configured as follows. Specifically, the socket management device further includes a socket acquisition module that judges whether to allow the request-source application to obtain a socket, based on the target socket count of the request-source application recalculated by the scheduling module, and that obtains, when it is judged that the request-source application is allowed to obtain a socket, a new socket for the request-source application from an operating system of the computer system.

With this configuration, the socket management device can obtain a socket for each application from the operating system as a deputy of the application, instead of leaving this socket acquisition task to the application. Therefore, the actual socket allocation count of each application can be made to reliably meet the target socket count thereof.

According to a second aspect of the invention, there is provided a socket management system including: one or more applications; and the socket management device having the configuration described above.

In the socket management system according to the second aspect of the invention, each application can obtain a socket for the application from the operating system. Specifically, each application includes a socket acquisition module that judges whether socket acquisition has been allowed, based on the response notified from the socket management device, and that obtains a new socket from an operating system of the computer system when it is judged that socket acquisition has been allowed.

In the socket management system according to the second aspect of the invention, the socket management device can obtain a socket for each application from the operating system as a deputy of the application. In this case, each application uses the socket for the application, obtained by the socket management device, to establish a network connection.

According to a third aspect of the invention, there is provided a socket management method of managing the number of sockets allocated to each of one or more applications operating in a computer system, the socket management method including: an application management step of storing a total socket count indicating the total number of sockets which can be allocated to all of the one or more applications, and a target socket count for each of the one or more applications indicating a target value for the number of sockets allocated to each of the one or more applications; a scheduling step of recalculating, when a socket-count change request indicating a socket acquisition request or a socket release request is received from any of the one or more applications, the target socket count of the request-source application which has issued the socket-count change request, based on the received socket-count change request and based on the total socket count and the target socket count for each of the one or more applications, which are stored in the application management step, and of updating the target socket count of the request-source application stored in the application management step so as to have the recalculated target socket count; and a response step of notifying a response corresponding to the target socket count recalculated in the scheduling step to the request-source application which has issued the socket-count change request.

According to a fourth aspect of the invention, there is provided a computer-readable computer program causing a computer to execute the method described above.

According to the aspects of the invention, sockets can be properly allocated to applications, thereby improving the connection performance for network communications. Since it is unnecessary to reserve in advance a socket that is not being actually used, waste of memory is reduced, thus allowing the corresponding memory resource to be allocated to another function.

BRIEF DESCRIPTION OF THE DRAWINGS

FIG. 2 is a diagram showing an example of a pattern calculation table which is one component of a schedule algorithm.

FIG. 3 is a diagram showing an example of a socket-allocation-count ratio table which is another component of the schedule algorithm.

FIG. 4 is a diagram showing a sequence in which a socket management section is activated and then a certain application is activated.

FIG. 5 is a diagram showing a sequence in which the application issues a socket acquisition request.

FIG. 6 is a diagram showing a sequence in which the application issues a socket release request.

DESCRIPTION OF EXEMPLARY EMBODIMENTS

Figure 1:
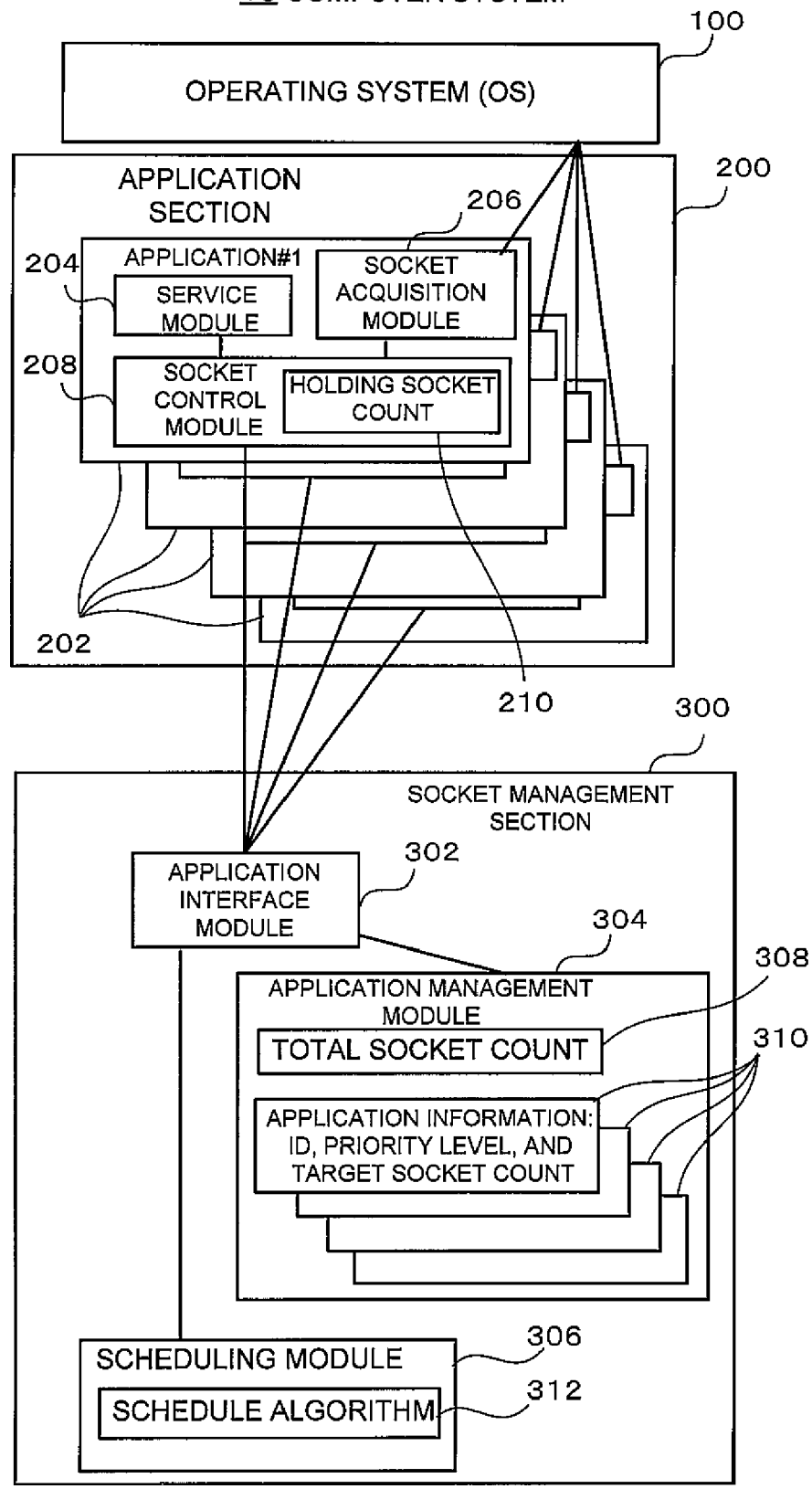
FIG. 1 is a block diagram showing a configuration of main parts in a computer system which includes a socket management system according to an embodiment of the invention.

FIG. 1 is a block diagram showing a configuration of main parts in a computer system 10 which includes a socket management system according to an embodiment of the invention.

The computer system 10 shown in FIG. 1 may have a relatively-large amount of memory like a personal computer or may have a relatively-small amount of memory like a computer system built in an apparatus such as a printer. In the latter case, advantages according to the principle of the invention are clearly provided.

As shown in FIG. 1, the computer system 10 includes an operating system (hereinafter referred to as "OS") 100, an application section 200, and a socket management section 300. The OS 100, the application section 200, and the socket management section 300 are typically realized when a computer machine executes corresponding computer programs.

The socket management section 300 corresponds to a socket management device according to an embodiment of the invention. The combination of the application section 200 and the socket management section 300 corresponds to a socket management system according to an embodiment of the invention.

The application section 200 is a group of one or more applications 202 each of which realizes a specific network service. Each of the applications 202 includes three modules, specifically, a service module 204, a socket acquisition module 206, and a socket control module 208.

The service module 204 is programmed by using a socket interface function, and realizes a network-service function.

The socket acquisition module 206 has a function of obtaining the number of sockets required by the application 202 from the OS 100 and of returning a socket no longer required by the application 202 to the OS 100, under the control of the socket control module 208.

The socket control module 208 has a function of adjusting, while managing the number of sockets actually used (actually held) (that is, a holding socket count 210) for the network service of the application 202, the holding socket count 210 of the application 202 to be equal to or lower than a target socket count notified by the socket management section 300.

The socket management section 300 has a function of managing the upper-limit number of sockets (that is, a target socket count) which can be used by each application 202 in the application section 200, operating under the control of the socket management section 300, (but not managing the holding socket count 210 itself); of scheduling (recalculating), every time a socket acquisition request or a socket release request is received from an application 202, the target socket count of the application 202 which has issued the request, according to the socket allocation state at that time point; and of notifying the target socket count to the application 202. Note that a modification may be configured such that, instead of notifying the target socket count, the socket management section 300 notifies information indicating whether the application 202 can obtain a new socket, to the application 202 in the application section 200 based on the target socket count.

The reason why the socket management section 300 does not manage the actual socket count held by each application 202 but manages the target socket count of the application 202 will be described below. Specifically, since the actual socket count is managed by the OS, even though a socket is released in the application 202, time lag occurs until the socket is actually released in the OS 100. Many usual OSs hold a socket to be released, for several tens of seconds to several minutes before actually releasing it. In other words, it is difficult to know the actual socket count from the outside of the OS. For this reason, the socket management section 300 does not manage the actual socket count held by each application 202 but manages the target socket count of the application 202. Accordingly, the target socket count is not always equal to the actual socket count. Therefore, the socket management section 300 may take into account the difference between the actual socket count held by each application 202 and the target socket count of the application 202, to schedule the target socket count.

The socket management section 300 includes three modules, specifically, an application interface module 302, an application management module 304, and a scheduling module 306.

The application interface module 302 is used to perform communications with the respective applications 202 included in the application section 200. The application interface module 302 has a function of mediating communication performed between each application 202 and the application management module 304 to register the application 202 in the application management module 304 when the application 202 is activated; a function of mediating communication performed between each application 202 and the application management module 304 to delete the registration of the application 202 when the application 202 is shut down; a function of mediating communication performed between each application 202 and the scheduling module 306 to schedule (recalculate) the target socket count when a socket acquisition request or a socket release request (hereinafter referred to as "socket-count change request") is issued by the application 202; and a function of mediating communication performed between each application 202 and the application management module 304 to notify the scheduled (recalculated) target socket count to the application 202.

The application management module 304 stores and manages application information 310 related to the identifier (ID), the priority level, and the target socket count of each application 202 that is currently operating (currently registered) in the application section 200, and stores and manages the total socket count (the maximum number of sockets which can be provided by the OS 100) 308 which can be used by the entire application section 200. The identifier (ID) of each application 202 is code the application management module 304 assigns to the application 202 when the application management module 304 registers the application 202. The priority level of each application 202 is specified in advance in the application 202. When an application 202 is activated, its priority level is notified by the application 202.

The application management module 304 has a function of registering an application 202 when the application 202 is activated (specifically, of generating and registering the application information 310); a function of deleting the registration of an application 202 when the application 202 is shut down (of deleting the application information 310); a function of calling the scheduling module 306 when a socket-count change request (a socket acquisition request or a socket release request) is issued by an application 202, and of notifying the pieces of application information 310 of all registered applications 202 and the total socket count 308 to the scheduling module 306; a function of updating the application information 310 of an application 202 so as to have a target socket count scheduled (recalculated) by the scheduling module 306; and a function of notifying the scheduled (recalculated) target socket count of an application 202 to the application 202.

The scheduling module 306 has a function of scheduling (recalculating), when a socket-count change request is issued by an application 202, the target socket count, which indicates the upper-limit number of sockets the application 202 can use, by using a schedule algorithm 312 set in advance, and of writing the calculation result to the application management module 304.

The optimum specific contents of the schedule algorithm 312 differ for each product category or for each product in which the computer system 10 is included. Thus, it is preferable that the schedule algorithm 312 be configured in the form of a program or data which can be separated from a program of the socket management section 300. Of course, the schedule algorithm 312 may be included in the program of the socket management section 300.

The schedule algorithm 312 is called from the application management module 304 when a socket-count change request is issued by an application 202. Then, the schedule algorithm 312 reads the pieces of application information (the ID, the priority level, and the target socket count) 310 of all registered (currently operating) applications 202 from the application management module 304, and schedules (recalculates) only the target socket count of the application 202 (for example, Application #1) which has issued the socket-count change request.

It is important that the schedule algorithm 312 does not schedule the target socket counts of all currently operating (registered) applications 202 but schedules only the target socket count of one application 202 which has issued the socket-count change request. This is because the client generally should have the initiative in determining when to end the network service provided to the client by each application 202. Therefore, the computer system 10, which provides the network service, should not forcibly close the socket used for the network service (if the socket is forcibly closed by the computer system 10, an error occurs in the client).

A specific example of the schedule algorithm 312 will be described below. In the example, the schedule algorithm 312 includes a pattern calculation table 312A shown in FIG. 2 and a socket-allocation-count ratio table 312B shown in FIG. 3.

The pattern calculation table 312A shown in FIG. 2 indicates the types of socket allocation patterns to be selected according to the ratio (%) of a remaining socket count with respect to the total socket count (the specific content of each pattern is defined in the socket-allocation-count ratio table 312B of FIG. 3). The remaining socket count is a value obtained by subtracting the sum of the target socket counts of the applications 202 from the total socket count, in other words, is the number of sockets which have not yet been obtained by any application. Note that the target socket count of each application 202 is set to "1" as an initial value when the application 202 is activated (registered), and the target socket count is updated thereafter every time it is scheduled.

Which socket allocation pattern is to be used is determined from the pattern calculation table 312A of FIG. 2.

For example, when the ratio of the remaining socket count with respect to the total socket count is equal to or higher than 50% (in other words, when the remaining socket count is relatively high), "Pattern 1" is selected. When the ratio of the remaining socket count with respect to the total socket count is equal to or higher than 20% and is lower than 50% (in other words, when the remaining socket count is intermediate), "Pattern 2" is selected. When the ratio of the remaining socket count with respect to the total socket count is lower than 20% (in other words, when the remaining socket count is relatively low), "Pattern 3" is selected.

The socket-allocation-count ratio table 312B shown in FIG. 3 defines, for each of the socket allocation patterns selected in FIG. 2, the socket-allocation-count ratio (the ratio of a socket count allocatable to each application with respect to the remaining socket count) (%) according to the priority level of the application. For example, in "Pattern 1", which is selected when the remaining socket count is relatively high, the socket-allocation-count ratio is 50% for an application 202 whose priority level is "Level 1" (high) and the socket-allocation-count ratio is 20% for an application 202 whose priority level is "Level 3T" (low). In this way, the difference in socket-allocation-count ratio between the higher priority level and the lower priority level is relatively small.

In "Pattern 2T", which is selected when the remaining socket count is intermediate, the socket-allocation-count ratio is 60% for an application 202 whose priority level is "Level 1" (high) and the socket-allocation-count ratio is 10% for an application 202 whose priority level is "Level 3" (low). In this way, the difference in socket-allocation-count ratio between the higher priority level and the lower priority level is intermediate.

Further, in "Pattern 3", which is selected when the remaining socket count is relatively low, the socket-allocation-count ratio is 80% for an application 202 whose priority level is "Level 1" (high) and the socket-allocation-count ratio is 5% for an application 202 whose priority level is "Level 3" (low). In this way, the difference in socket-allocation-count ratio between the higher priority level and the lower priority level is significantly large.

The priority level of each application 202 is determined such that a higher priority level is given to an application whose level of importance is higher. For example, in the case of a printer, it is possible to give a high priority level, for example, "Level it", to the printing protocol related to the most important printing function, and to give a low priority level, for example, "Level 3T", to applications, such as Web and Telnet, whose levels of importance are low.

According to the socket-allocation-count ratio table 312B shown in FIG. 3, an application having a higher priority level is given a higher socket-allocation-count ratio than that given to an application having a lower priority level; and the smaller the remaining socket count is, the larger the difference in socket-allocation-count ratio between a higher priority level and a lower priority level becomes. As a result, even when the remaining socket count is changed, an application that has a higher priority level (in other words, has a higher importance level) can stably hold a certain number of sockets.

An operation of the computer system 10, having the above-described configuration, will be described below with reference to sequence diagrams shown in FIGS. 4 to 7.

FIG. 4 shows a sequence in which, after the computer system 10 is activated, the socket management section 300 is first activated and then a certain application 202 is activated.

As shown in FIG. 4, first, a main task 400 of the computer system 10 generates and initializes the application interface module 302 of the socket management section 300 (Step S1). Next, the application interface module 302 generates and initializes the application management module 304 (Step S2). The application management module 304 specifies the total socket count 308 (Step S3). The total socket count 308 may be a fixed value programmed in advance by the application management module 304, or may be specified based on total socket count data which is externally read. Next, the application management module 304 returns a response indicating that the application management module 304 has been normally generated, to the application interface module 302 (Step S4).

The application interface module 302 generates the scheduling module 306 (Step S5). The scheduling module 306 returns a response indicating that the scheduling module 306 has been normally generated, to the application interface module 302 (Step S6). The application interface module 302 returns a response indicating that the application interface module 302 has been normally generated, to the main task 400 (Step S7). As described above, the socket management section 300 is generated.

When activation of a certain application 202 is requested thereafter, the main task 400 generates the service module 204 of the application 202 (Step S8). The service module 204 generates the socket control module 208 (Step S9). The socket control module 208 notifies the priority level of the application 202 to the application interface module 302 of the socket management section 300, to make a request for registration of the application 202 (Step S10). The application interface module 302 of the socket management section 300 notifies the priority level of the application 202 to the application management module 304, to make a request for registration of the application 202 (Step S1).

The application management module 304 generates and stores application information (the ID, the priority level, and the target socket count (initial value is "1")) 310 of the application 202, thereby registering the application 202. Then, the application management module 304 returns a response that includes the ID of the registered application 202 to the application interface module 302 (Step S12). This response information is sequentially returned from the application interface module 302 to the socket control module 208 (Step S13), from the socket control module 208 to the service module 204 (Step S14), and from the service module 204 to the main task 400 (Step S15). As described above, the application 202 is activated.

FIG. 5 is a sequence following the sequence shown in FIG. 4. In the sequence of FIG. 5, the application 202 issues a socket acquisition request.

First, the service module 204 of the application 202 sends a socket acquisition request (one of socket-count change requests) that includes a desired acquisition socket count (which is usually one but may be two or more), to the socket control module 208 (Step S21). The socket control module 208 sends a schedule request that includes the desired acquisition socket count and the ID of the application 202, to the application interface module 302 of the socket management section 300 (Step S22). The application interface module 302 sends the schedule request to the scheduling module 306 (Step S23).

The scheduling module 306 sends an application information acquisition request to the application management module 304 (Step S24). The application management module 304 returns the total socket count and the pieces of application information 310 of all applications 202 that are currently registered, to the scheduling module 306 (Step S25).

The scheduling module 306 uses the schedule algorithm 312 to perform scheduling (recalculation) of the target socket count of the request-source application 202, which has issued the socket acquisition request, based on the returned total socket count and pieces of application information 310, the acquisition socket count desired by the request-source application 202, and the priority level of the request-source application 202 (Step S26).

For example, the remaining socket count is calculated by subtracting, from the total socket count, the sum of the current target socket counts of all applications 202 currently operating, the current target socket counts being obtained from the pieces of application information 310. With the use of FIG. 2, one socket allocation pattern is selected according to the ratio of the remaining socket count with respect to the total socket count. According to the selected socket allocation pattern shown in FIG. 3, a socket-allocation-count ratio for the priority level of the request-source application 202 is determined. By multiplying the socket-allocation-count ratio by the remaining socket count, a socket count newly allocatable to the request-source application 202 is calculated. Then, the calculated allocatable socket count is compared with the above-mentioned desired acquisition socket count.

As a result of the comparison, when the calculated allocatable socket count is equal to or larger than the desired acquisition socket count, it means that the request-source application 202 can newly obtain all of the desired acquisition socket count. In this case, the desired acquisition socket count is added to the current target socket count of the request-source application 202 to obtain a new target socket count (recalculated target socket count).

On the other hand, as a result of the comparison, when the calculated allocatable socket count is one or more but is lower than the desired acquisition socket count, it means that the number of sockets that can be obtained by the request-source application 202 equals to the calculated allocatable socket count. In this case, the calculated allocatable socket count is added to the current target socket count of the request-source application 202 to obtain a new target socket count (recalculated target socket count).

Further, when the calculated allocatable socket count is lower than 1, it means that the request-source application 202 cannot obtain a new socket. In this case, a value identical to the current target socket count of the request-source application 202 is obtained as a new target socket count (recalculated target socket count).

As described above, the scheduling module 306 schedules (recalculates) the target socket count of the request-source application 202. The scheduling module 306 updates the target socket count in the application information 310 of the request-source application 202, stored in the application management module 304, so as to have the scheduled (recalculated) target socket count (Steps S27 to S28).

Then, the scheduling module 306 returns a response indicating that scheduling of the target socket count has been completed, to the application interface module 302 (Step S29). The response is further returned from the application interface module 302 to the socket control module 208 (Step S30).

The socket control module 208 sends a request to obtain the updated target socket count to the application interface module 302 (Step S31). The application interface module 302 thus sends the request to obtain the updated target socket count to the application management module 304 (Step S32).

The application management module 304 returns a notification of the updated target socket count of the request-source application 202, stored in the application management module 304, to the application interface module 302 (Step S33). The notification of the updated target socket count is returned from the application interface module 302 to the socket control module 208 (Step S34), and is further returned from the socket control module 208 to the service module 204 (Step S35).

Note that a modification may be configured such that, instead of the notification of the updated target socket count, a notification of the number of sockets that can be newly obtained is returned from the application management module 304 to the service module 204.

As described above, the request-source application 202, which has issued the socket acquisition request, can understand the number of sockets that can be newly obtained (for example, equal to the above-mentioned desired acquisition socket count; equal to 1 or more but lower than the desired acquisition socket count; or equal to 0) based on the notification returned from the application management module 304. For example, when the notification of the updated target socket count is returned, the number of sockets that can be newly obtained is calculated by subtracting the number of obtained sockets from the notified target socket count. Then, the socket acquisition module 206 (not shown in the sequence) of the request-source application section 200 actually obtains the same number of sockets as the number of sockets that can be obtained, from the OS 100.

As described above, the socket management section 300 does not perform anything about the operation in which each application 202 actually obtains a socket from the OS 100, but just plays a role of providing the target socket count (in other words, an advice as to whether a new socket can be obtained) to each application 202.

FIG. 6 shows a sequence in which the application 202 issues an obtained-socket release request.

First, the service module 204 of the application 202 sends a socket release request (one of socket-count change requests) for a socket no longer required, to the socket control module 208 (Step S41). The socket control module 208 sends a schedule request which includes a desired release socket count to the application interface module 302 of the socket management section 300 (Step S42). Further, the application interface module 302 sends the schedule request to the scheduling module 306 (Step S43).

The scheduling module 306 thus obtains, from the application management module 304, the application information 310 of the request-source application 202, which has sent the socket release request (Steps S44 and S45). The scheduling module 306 subtracts the desired release socket count from the target socket count in the application information 310 of the request-source application 202, thereby obtaining a new target socket count of the request-source application 202 (Step S46).

After the scheduling module 306 performs scheduling (recalculation) of the target socket count of the request-source application 202 in this manner, the scheduling module 306 specifies the scheduled (recalculated) target socket count in the application management module 304 (Steps S47 and S48).

A response indicating that scheduling has been completed is returned from the scheduling module 306 to the application interface module 302 (Step S49), from the application interface module 302 to the socket control module 208 (Step S50), and further from the socket control module 208 to the service module 204 (Step S51).

Then, the socket acquisition module 206 (not shown in the sequence) of the request-source application 202 requests the OS 100 to release the socket no longer required.

Figure 7:
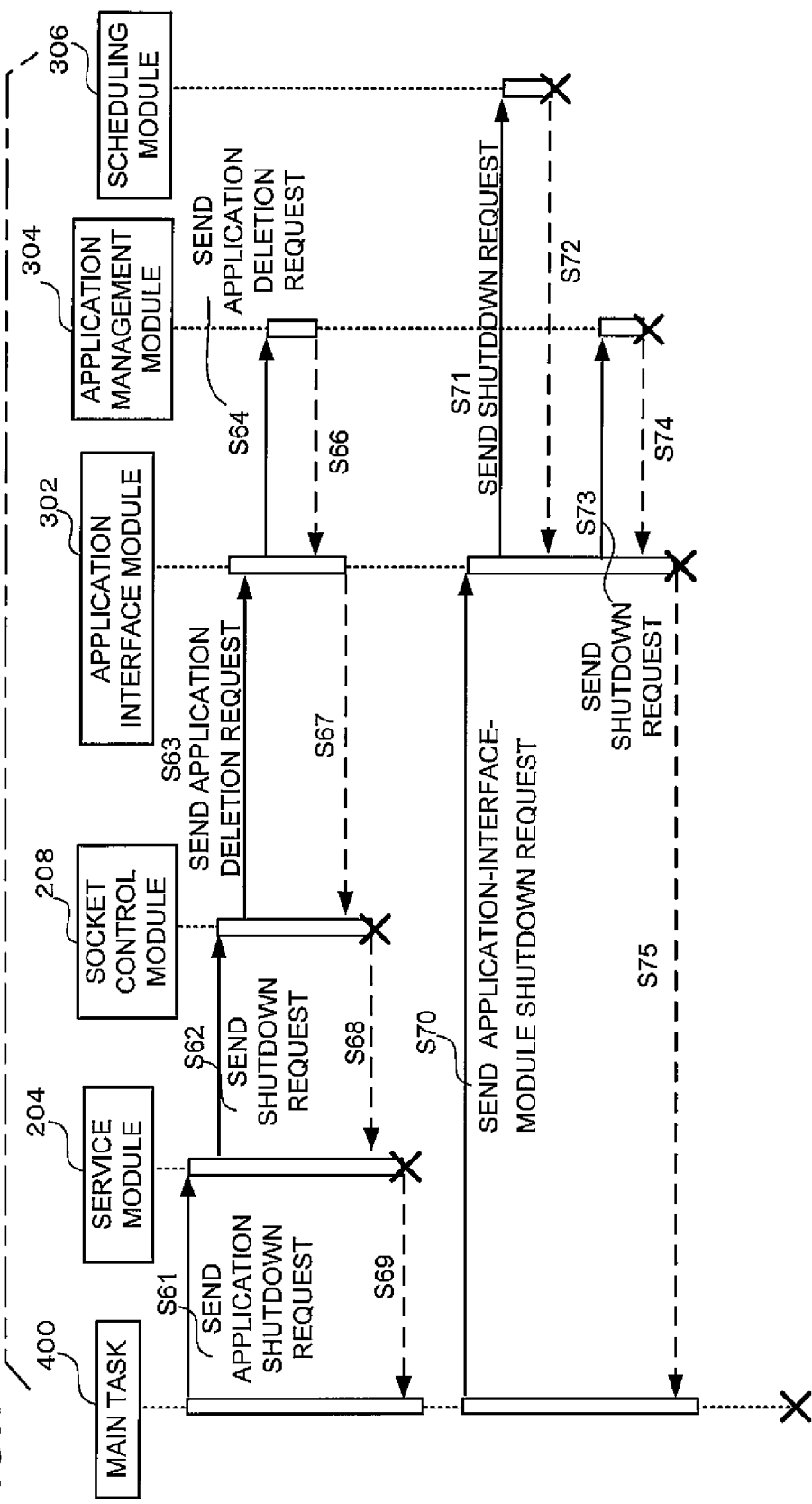
FIG. 7 is a diagram-showing a sequence in which the application is shut down and then a socket management section is shut down.

FIG. 7 shows a sequence in which the application 202 is shut down and then the socket management section 300 is shut down. When shutdown of the application 202 is requested, the main task 400 sends a shutdown request to the service module 204 of the application 202 (Step S61), and the service module 204 sends a shutdown request to the socket control module 208 (Step S62). The socket control module 208 sends a request to delete the registration of the application 202 to the application interface module 302 of the socket management section 300 (Step S63). Further, the application interface module 302 sends the request to delete the registration of the application 202 to the application management module 304 (Step S64).

The application management module 304 deletes the application information 310 of the application 202, thereby deleting the registration of the application 202. The application management module 304 returns a response indicating that the registration of the application 202 has been deleted, to the application interface module 302 (Step S66). The application interface module 302 returns the response to the socket control module 208 (Step S67).

The socket control module 208 returns a response indicating that the socket control module 208 will be shut down to the service module 204 (Step S68), and is shut down. The service module 204 returns a response indicating that the service module 204 will be shut down to the main task 400 (Step S69), and is shut down.

Thereafter, when the computer system 10 is about to end the operation, the main task 400 sends a shutdown request to the application interface module 302 (Step S70). The application interface module 302 sends a shutdown request to the scheduling module 306 (Step S71). The scheduling module 306 returns a response indicating that the scheduling module 306 will be shut down to the application interface module 302 (Step S72), and is shut down.

The application interface module 302 sends a shutdown request to the application management module 304 (Step S73). The application management module 304 returns a response indicating that the application management module 304 will be shut down to the application interface module 302 (Step S74), and is shut down.

Then, the application interface module 302 returns a response indicating that the application interface module 302 will be shut down to the main task 400 (Step S75), and is shut down. Then, the main task 400 is shut down, thereby ending the operation of the computer system 10.

Figure 8:
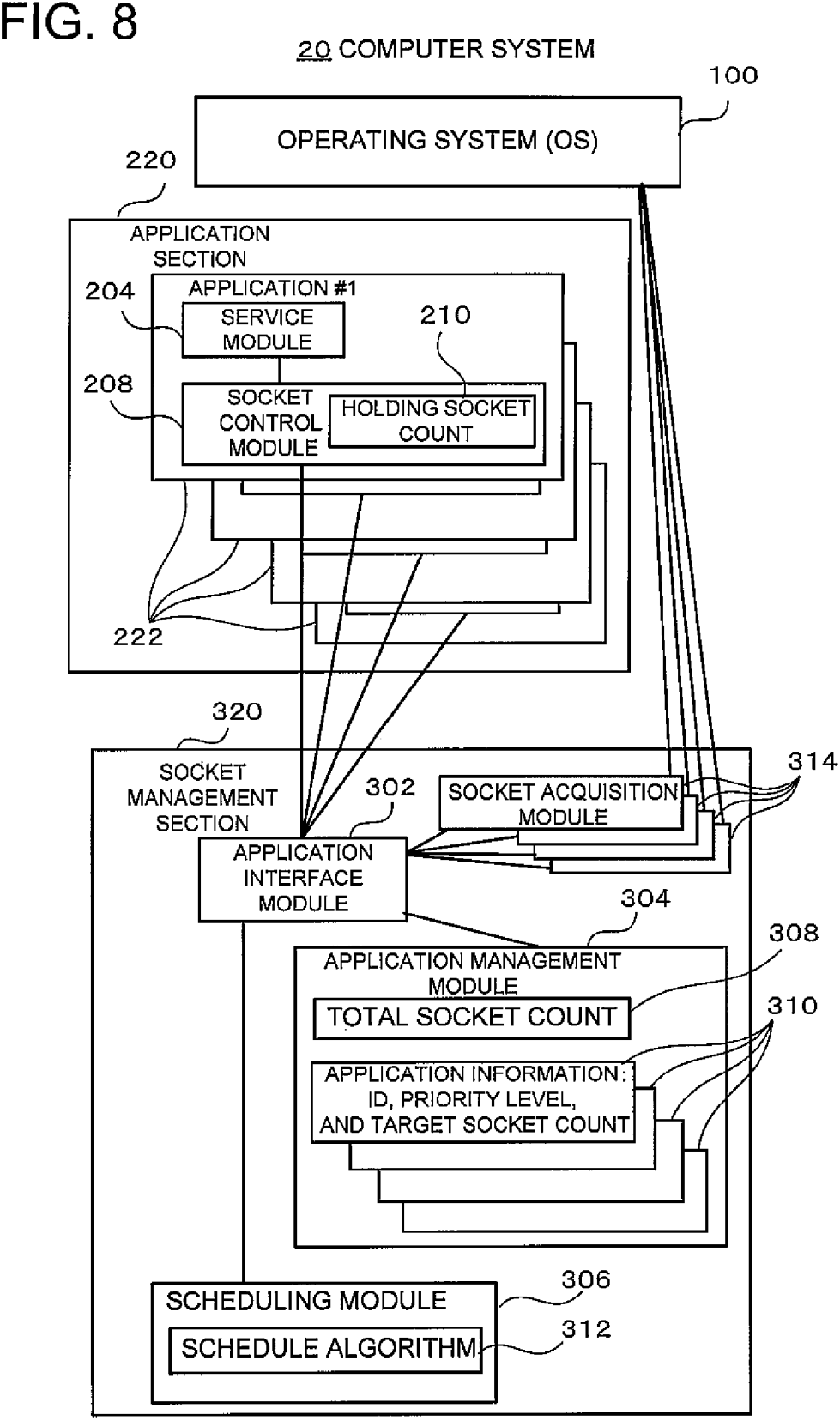
FIG. 8 is a block diagram showing a configuration of main parts in a computer system which includes a socket management system according to another embodiment of the invention.

FIG. 8 is a block diagram showing a configuration of main parts in a computer system 20 which includes a socket management system according to another embodiment of the invention.

In the computer system 10 shown in FIG. 1, each application 202 has the socket acquisition module 206. In contrast, in the computer system 20 shown in FIG. 8, a socket management section 320 has socket acquisition modules 314 which obtain sockets for the corresponding applications 222, from the OS 100. In the computer system 20, when a certain application 222 issues a socket-count change request (a socket acquisition request or a socket release request), the socket acquisition module 314 allocated to the request-source application 222 obtains a new socket from the OS 100 or releases an obtained socket, based on the target socket count of the request-source application 222, scheduled by the scheduling module 306. The request-source application 222 performs the network service using the socket obtained by the socket acquisition module 314.

As described above, since the socket management section 320 not only calculates the target socket count of each application 222 but also actually obtains or releases a socket for the application 222 based on the target socket count, it is possible to reliably make the actual holding socket count of each application 222 equal to the target socket count thereof (except for a period of time lag from when the OS 100 is requested to release a socket to when the socket is actually released).

The preferred embodiments of the invention have been described above. The embodiments are merely examples used to explain the invention, and do not limit the scope of the invention. The invention can be applied to various aspects different from the above-described embodiments without departing from the gist thereof.

What is claimed is:

1. A socket management device that manages a number of sockets allocated to each of one or more applications operating in a computer system, the socket management device comprising:
a computer memory;
a means for application management that stores a total socket count indicating a total number of sockets which can be allocated to all of the one or more applications, and a target socket count for each of the one or more applications indicating a target value for the number of sockets allocated to each of the one or more applications, wherein the means for application management is embedded in the computer memory;
a means for scheduling that recalculates, when a socket-count change request indicating a socket acquisition request or a socket release request is received from any of the one or more applications, the target socket count of a request-source application which has issued the socket-count change request, based on the received socket-count change request and based on the total socket count and the target socket count for each of the one or more applications, which are stored in the means for application management, and that updates the target socket count of the request-source application stored in the means for application management so as to have the recalculated target socket count; and
a means for response that generates a response to the socket-count change request based on the target socket count recalculated by the means for scheduling, and that notifies the response to the request-source application.

2. A socket management device according to claim 1, wherein:
the means for application management further stores a priority level of each of the one or more applications; and
the means for scheduling recalculates the target socket count of the request-source application based on the received socket-count change request, based on the total socket count and the target socket count for each of the one or more applications, which are stored in the means for application management, and based on the priority level of the request-source application, which is stored in the means for application management.

3. A socket management device according to claim 2, wherein the means for scheduling determines a socket-allocation-count ratio among the one or more applications based on the priority level of each of the one or more applications, stored in the means for application management, and determines the target socket count of the request-source application according to the determined socket-allocation-count ratio.

4. A socket management device according to either one of claims 1 to 3, wherein the means for scheduling controls a socket-allocation-count ratio among the one or more applications according to a remaining socket count which corresponds to a difference between the total socket count and a sum of the target socket counts of the one or more applications.

5. A socket management device according to claim 1, further comprising a means for socket acquisition that judges whether to allow the request-source application to obtain a socket, based on the target socket count of the request-source application recalculated by the means for scheduling, and that obtains, when the means for socket acquisition judges that the request-source application is allowed to obtain a socket, a new socket for the request-source application from an operating system of the computer system.

6. A socket management system, comprising:
one or more applications; and
a socket management device comprising: a means for application management that stores a total socket count indicating a total number of sockets which can be allocated to all of the one or more applications, and a target socket count for each of the one or more applications indicating a target value for the number of sockets allocated to each of the one or more applications; a means for scheduling that recalculates, when a socket-count change request indicating a socket acquisition request or a socket release request is received from any of the one or more applications, the target socket count of a request-source application which has issued the socket-count change request, based on the received socket-count change request and based on the total socket count and the target socket count for each of the one or more applications, which are stored in the means for application management, and that updates the target socket count of the request-source application stored in the means for application management so as to have the recalculated target socket count;
and a means for response that generates a response to the socket-count change request based on the target socket count recalculated by the means for scheduling, and that notifies the response to the request-source application,
wherein each of the one or more applications includes a first means for socket acquisition that judges whether socket acquisition has been allowed, based on the response notified from the socket management device, and that obtains a new socket from an operating system of the computer system when the first means for socket acquisition judges that socket acquisition has been allowed.

7. A socket management system according to claim 6, wherein the socket management device further comprises: a second means for socket acquisition that judges whether to allow the request-source application to obtain a socket, based on the target socket count of the request-source application recalculated by the means for scheduling, and that obtains, when the second means for socket acquisition judges that the request-source application is allowed to obtain a socket, a new socket for the request-source application from an operating system of the computer system,
wherein each of the one or more applications uses a socket for the application, obtained by the socket management device.

8. A socket management method for managing a number of sockets allocated to each of one or more applications operating in a computer system, the socket management method comprising:
an application management step of storing a total socket count indicating a total number of sockets which can be allocated to all of the one or more applications, and a target socket count for each of the one or more applications indicating a target value for the number of sockets allocated to each of the one or more applications;

a scheduling step of recalculating, when a socket-count change request indicating a socket acquisition request or a socket release request is received from any of the one or more applications, the target socket count of a request-source application which has issued the socket-count change request, based on the received socket-count change request and based on the total socket count and the target socket count for each of the one or more applications, which are stored in the application management step, and of updating the target socket count of the request-source application stored in the application management step so as to have the recalculated target socket count; and a response step of generating a response to the socket-count change request based on the target socket count recalculated in the scheduling step, and of notifying the response to the request-source application.

9. A computer-readable computer program recorded on a non-transitory computer-readable medium and causing a computer to execute a method for managing a number of sockets allocated to each of one or more applications operating in a computer system, the method comprising:

an application management step of storing a total socket count indicating a total number of sockets which can be allocated to all of the one or more applications, and a target socket count for each of the one or more applications indicating a target value for the number of sockets allocated to each of the one or more applications;

a scheduling step of recalculating, when a socket-count change request indicating a socket acquisition request or a socket release request is received from any of the one or more applications, the target socket count of a request-source application which has issued the socket-count change request, based on the received socket-count change request and based on the total socket count and the target socket count for each of the one or more applications, which are stored in the application management step, and of updating the target socket count of the request-source application stored in the application management step so as to have the recalculated target socket count; and a response step of generating a response to the socket-count change request based on the target socket count recalculated in the scheduling step, and of notifying the response to the request-source application.

\* \* \* \* \*